(12) United States Patent
Andel (10) Patent No.: US 9,864,089 B2
(45) Date of Patent: Jan. 9, 2018

(54) DETECTOR WITH TELESCOPING SUPPORT POLE AND FOLDABLE ARM SUPPORT

(71) Applicant: Vallon GmbH, Eningen (DE)

(72) Inventor: Benjamin Andel, Tuebingen (DE)

(73) Assignee: VALLON GMBH, Eningen (DE)

( * ) Notice: Subject to any disclaimer, the term of this patent is extended or adjusted under 35 U.S.C. 154(b) by 338 days.

(21) Appl. No.: 14/841,906

(22) Filed: Sep. 1, 2015

(65) Prior Publication Data

US 2016/0231448 A1    Aug. 11, 2016

(30) Foreign Application Priority Data

Oct. 22, 2014    (EP) ..................................... 14189899

(51) Int. Cl.
*G01V 3/15*    (2006.01)
*F41H 11/136*    (2011.01)

(52) U.S. Cl.
CPC .............. *G01V 3/15* (2013.01); *F41H 11/136* (2013.01)

(58) Field of Classification Search
CPC .......... G01V 3/15; G01V 3/165; F41H 11/136
See application file for complete search history.

(56) References Cited

U.S. PATENT DOCUMENTS

| | | | |
|---|---|---|---|
| D652,330 S | 1/2012 | Arnold et al. | |
| 2007/0068008 A1* | 3/2007 | Wu | A01D 34/416 30/276 |
| 2014/0143984 A1* | 5/2014 | Andel | G01V 3/15 16/429 |

FOREIGN PATENT DOCUMENTS

| | | | | |
|---|---|---|---|---|
| DE | 202010006602 U1 * | 6/2011 | ............. | A63B 23/12 |
| DE | 202012104609 | 2/2013 | | |
| EP | 0884609 A1 * | 12/1998 | ............... | G01V 3/15 |
| EP | 0884609 A1 | 12/1998 | | |

OTHER PUBLICATIONS

Espacenet translate DE202010006602, Dec. 16, 1998 (Translated Aug. 24, 2017), pp. 1-9.*
Espacenet translate—EP0884609, Translated Sep. 28, 2017, pp. 1-5.*

* cited by examiner

*Primary Examiner* — Melissa Koval
*Assistant Examiner* — Courtney McDonnough
(74) *Attorney, Agent, or Firm* — Von Rohrsheidt Patents (57) ABSTRACT

A detector with a telescoping support tube wherein a measuring probe is arranged at a front of a forward tube element and an electronics unit with a battery compartment, a handle element and axially offset rearward therefrom a U-shaped arm shell with two arm support bars are arranged at a rear tube element, wherein the arm support bars are pivotable relative to the rear tube element. The arm shell is axially moveable relative to the handle element and includes two arm shell elements which are laterally arranged at a support slide and pivotably moveable in a transversal direction of the support tube. The support slide is supported axially moveable by a support rail. According to the invention it is provided that the support slide is fixateable in a disengageable manner at the support rail at various locations through the arm shell elements.

16 Claims, 4 Drawing Sheets

DETECTOR WITH TELESCOPING SUPPORT POLE AND FOLDABLE ARM SUPPORT

RELATED APPLICATIONS

This application claims priority from and incorporates by reference European Patent application EP 14 189 899.9 filed on Oct. 22, 2014.

FIELD OF THE INVENTION

The invention relates to a detector.

BACKGROUND OF THE INVENTION

A detector of this general type is known for example from U.S. Pat. No. D652,330 S. In this detector the support rail is configured as a circular rod which is supported by two clamps which are arranged at a battery compartment that is pivotably connected with the rear tube end of the rear tube element. The support rail extends over an entire length of the battery compartment. The support rail is divided by one of the clamps into a forward rail section and a rear rail section. The rear rail section oriented away from the support tube supports the support slide with the arm shell. Another support slide is arranged at the forward rail section oriented towards the support tube, wherein the other support slide supports the handle element wherein the handle element is pivotably supported in a longitudinal direction of the support tube at the second support slide. The two support slides are supported with their flat bottom sides on the battery compartment, so that a lateral movement of the two slides in a circumferential direction of the cylinder shaped support rail is excluded. The two support slides and the battery compartment include locking elements that are associated with each other wherein the slides are disengageably attached at predetermined locations of the support rail using the locking elements. The two arm support bars that are pivotably arranged at the rear support slide are configured in two components. A first bar element is connected with the support slide through a pivot link and the other second arm bar element is connected with the first bar element through a hinge. The two bar elements are thus freely moveable orthogonal to the support tube and can be pivoted away from one another and towards each other at will. In order to fixate the four bar elements forming the arm shell a tightening belt is provided which is supported by recesses of the two arm support bars and of the slide. Using the tightening belt the two arm support bars can be brought into contact with a lower arm of a user of the detector. The battery compartment on which the support slide is arranged is linked at the rear tube end of the rear tube element of the support tube. The known detector can be moved from a longitudinally extended operating position for detecting objects into a folded space saving idle position for transporting or storage and vice versa. In the compact idle position the tube elements of the telescoping support tube are slid into each other and the support tube is thus shortened. In this position namely the measuring probe and the battery compartment which are respectively connected through a pivot link with the forward or rear tube element of the support tube are pivoted against the support tube and extend in parallel and in contact with the support tube. In the operating position of the detector the arm support bars extend laterally from the battery compartment and the arm support elements are folded into contact with the battery compartment in an idle position of the detector.

It is a disadvantage of this known detector that the two arm support elements are freely moveable in the idle position and also in the operating position and have to be brought into the respective position by hand and have to be supported in these positions using the tightening belt. This is complicated and uncomfortable for a user. It is furthermore disadvantageous that the support rail has a circular cross section which requires supporting the associated support slide on the battery housing so that the support slide does not rotate in the circumferential direction of the support slide.

BRIEF SUMMARY OF THE INVENTION

It is an object of the invention to improve upon the known detectors recited supra so that a simple and user friendly switch between the operating position and the non-operating position of the detector is possible, wherein in particular the axial move ability of the arm shell relative to the handle element and a transition of the arm support elements from the operating position into the idle position and vice versa shall be improved.

This object is achieved according to the invention by a detector with a telescoping support tube, with at least one forward tube element and a rear tube element, wherein a measuring probe is pivotably attached at the forward tube element and an electronics unit with a battery compartment and a handle element and axially offset therefrom in rearward direction a U-shaped arm shell with two arm contact arms is attached at the rear tube element wherein the arm shell is axially moveable relative to the handle element and includes two arm shell elements which are arranged laterally at a support slide arranged and pivotably moveable in transversal direction of the support tube, wherein the support slide is supported axially moveable by a support rail attached at a rear tube end of the rear tube element wherein the support rail extends in the longitudinal direction of the support tube.

Further advantageous embodiments can be derived from the dependent patent claims.

Accordingly the detector according to the invention includes two arm shell elements supported by the support slide respectively including one arm support element with a support extension through which the arm shell elements are attached at the support slide laterally moveable. Thus the arm shell elements are respectively provided integrally in one piece and provided stiff with respect to bending. They are made for example as injection molded components from a plastic material so that the bar extension extending the arm support bar can be formed in a simple manner directly at the arm support bar. It is furthermore provided according to the invention that the support rail has a cross sectional contour with two lateral rail longitudinal sides and the support slide includes two lateral slide longitudinal sides which respectively extend in the longitudinal direction of the support tube and which contact each other, wherein the slide longitudinal sides include at least one longitudinal groove for receiving the slide longitudinal sides of the support rails. Thus the cross sectional shape of the support rail is non-circular, this means polygonal for example rectangular or oval. Thus the support slide is safely supported axially moveable at the support rail which also assures that the support slide with the two arm support bars arranged thereon is not rotate able in the circumferential direction of the support tube. According to the invention the support slide is attachable at the support rail in a disengageable manner at various locations using the arm shell elements. Thus the two arm shell elements are moveably attached at the support slide with their bar extensions so that they are pivotable about a limited pivot angle. Thus they are arranged axially non moveable in the longitudinal direction of the support slide.

A locking of the support slide at the support rail is performed advantageously at least at two, advantageously at more than 2 locations of the support rail so that a distance of the arm shell relative to the handle element is adjustable in increments. This facilitates a simple ergonomic adaptation of the detector, to a lower arm length of the user. Thus plural operating positions are available for the arm shell which operating positions are freely selectable. Additionally a particular resting position is provided in addition to the operating positions. In the resting position the support slide is proximal to the handle element, in the operating positions the support slide is further remote from the operating positions, this means in a medium to rear portion of the support rail. In order to move the support slide relative to the support rail, this means when transitioning from one operating position to another or to the idle position at least one of the two arm shell elements, advantageously both arm shell elements have to be pivoted laterally in order to disengage a locking between the support slide and the support rail. The fixation of the support slide at the support rail can be provided irrespective of the technical configuration in that at least one of the two arm support bars is pivoted towards the other arm support bar or in an opposite direction, this means the intermediary space between the arm support bars is reduced or enlarged. Advantageously the support slide is fixated at both slide longitudinal sides. The locking of the support slide at the support rail is performed in any case using the bar extensions of the arm shell elements which are used for attaching the arm support elements at the support slide. Thus special locking devices are arranged at the bar extensions and correspondingly configured opposite locking devices are configured at the support rail, wherein the locking devices can be brought into engagement or out of engagement with the opposite locking devices by moving the arm support bars. Thus additional fixation devices can be provided at the support rail, the support slide and/or the arm support bars wherein the fixation devices fixate the bar extensions in pivot direction in a disengageable manner, when the engagement devices are in or out of engagement.

Advantageously the two arm shell elements are force loaded using at least one spring which spreads the arm support bars. The spring acts in particular upon the bar extension of the arm support bars. For a spring basically any type of spring can be used, for example a compression spring, a tension spring or a torsion spring in a flat, wound or coil shape with a suitable size. A spring is preferred that impacts the arm shell elements wherein the spring, is configured as a wound torsion spring. In an advantageous embodiment of the invention the rail longitudinal sides include a plurality of first transversal locking grooves which are configured narrower than or with equal width as the bar extensions, wherein at least respective locking protrusion is arranged at the bar extensions, and associated with the transversal locking grooves. The locking protrusions and the first transversal locking grooves interlock the support slide with the support rail in a disengageable manner upon engagement, wherein movement stops are arranged as stoppers for the arm shell elements adjacent to and/or in the first transversal locking grooves, wherein the movement stops limit a pivot angle of the arm shell elements and prevent a flipping of the arm support bars in an opposite direction towards the support rail. Advantageously two respective locking protrusions are arranged at the bar extensions wherein the locking protrusions simultaneously engage two of the first locking grooves of the support rail when the support slide is interlocked with the support rail. The first locking grooves advantageously have identical distance from each other so that the support slide can be moved in increments by the same distance on the support slide. Thus the distance of adjacent locking grooves between each other ideally corresponds to the axial distance of the locking protrusions from each other, in particular when two locking protrusions are provided at the bar extensions. When the first transversal locking grooves are configured narrower than the respective bar extension the movement stops at the support rail can be arranged at a left side and/or at a right side of the transversal locking grooves, and/or in the locking grooves. In the other case when the transversal locking grooves have the same width as the respective bar extension the movement stops at the support rail are respectively arranged only in the transversal locking grooves. An axial width of the locking protrusions is adapted in particular to a width of the first transversal locking grooves so that the arm shell elements are fixated in axial direction at the support rail through the engagement protrusion when they engage the transversal locking grooves. The movement stops can be configured with any axial width. They can impact the respective bar extension in the portion or adjacent to the portion with the at least one locking protrusion.

In an advantageous embodiment of the invention it is provided that the longitudinal sides of the rails respectively include a differently shaped second transversal locking groove in addition to the plural first locking grooves wherein the second transversal locking groove is configured with equal width or wider than the extension bars, wherein the pivot angle of the arm shell elements is not limited by movement stops, so that the arm shell elements are pivotable in the opposite direction and wherein the bar extensions axially fixate the support slide at the support rail when they engage the second transversal locking grooves of the support rail.

The at least one spring provided in this embodiment of the invention for each arm shell element which impacts the arm shell elements keeps the locking protrusions in an operating position in engagement in the first transversal locking grooves configured narrower than the bar extensions and keeps the bar extensions in engagement with the second transversal locking grooves configured with the same width as or wider than the bar extensions in an idle position. Thus the arm support bars are respectively arranged in defined positions relative to the support rail. In various operating positions they form the U-shaped arm shell wherein the arm support bars extend essentially in the same direction as the handle element laterally protruding from the rear tube element. In the idle position in which the arm shell elements are pivoted over with respect to the operating position both arm support bars essentially extend in an opposite direction compared to the protruding handle element. This achieve a typical pivot angle of the arm shell elements by about 180°. The actual pivot angle however can deviate therefrom by a couple of degrees since it depends on the angle at which the arm support bars extend relative to the support slide in the operating position. In the idle position that is opposite to the operating position the arm support bars extend approximately orthogonal to the support slide.

In one embodiment of the detector according to the invention the support rail includes at least one longitudinal bar laterally at the longitudinal sides of the rails wherein the at least one longitudinal bar is associated with the at least one longitudinal groove of the support slide which is provided at the longitudinal sides of the slide. Thus the transversal locking grooves and/or the movement stops are formed at the longitudinal bar. Thus the support slide is slideable in the longitudinal direction of the support rail in a groove and key system, wherein a position of the arm shell is selectable.

In an advantageous embodiment of the invention a support block is attached at the rear tube end of the rear tube element wherein the support block pivotably connects the support rail with a forward rail end oriented towards the support tube and/or the handle element with a rear handle end oriented towards the support tube. The respective connection can be provided directly or indirectly. Thus the handle element and also the arm shell are pivotably supported independent from each other. The handle element can be advantageously pivoted in a direction of the rear tube element of the telescoping support tube so that it contacts the support tube and extends parallel thereto. The same applies for the support rail which supports the support slide with the two arm shell elements. The support block in one embodiment of the detector according to the invention is non-moveable in the longitudinal direction and also in the circumferential direction of the rear tube element and arranged at the rear tube end. In another embodiment the support block is non moveable in the longitudinal direction of the rear tube element and interlocked at the rear tube element in a disengageable manner in a circumferential direction of the rear tube element so that the handle element and the support rail are rotatable together with the support slide and the arm shell arranged thereon relative to the support tube or the measuring probe that is pivotably attached at the forward tube element.

In an advantageous embodiment of the detector according to the invention the support rail is pivotable between an operating position axially extending the rear tube element and an idle position contacting the rear tube element in parallel. In another embodiment of the detector the handle element is pivotable between an operating position transversally protruding from the rear tube element and an idle position contacting the rear tube element in parallel.

Advantageously in one embodiment the handle element and/or the support slide is fixate able in a disengageable manner in the operating position through an interlocking device that is individually provided at the support block. The interlocking at least relates to the operating position of the handle element and the support rail with the support slide and the arm shell. An additional interlocking in the idle position can be optionally provided. The interlocking is thus provided respectively through correspondingly configured known and common interlocking elements of any type. Neither in the operating position nor in the idle position the handle element and the support slide are disengageably attached at each other.

In another advantageous embodiment the handle element and the support slide are attachable at each other in a disengageable manner through an interlocking provided at the handle element and/or at the support rail so that they are fixate able relative to the bearing block in a non-movable manner. The interlocking is thus also provided by corresponding configured known and typical interlocking elements of any type. When disengaging the interlocking the handle element and also the support rail can be pivoted independently from each other. An additional interlocking in the idle position can be optionally provided at the bearing block.

In the idle position the arm support bars are oriented in a direction towards the handle element and laterally contact the rear support tube or the electronic unit arranged at a rear of the support tube and/or the battery compartment. Since the support tube is pushed together in the idle position of the detector so that the probe can be placed in parallel laterally at the rear tube element, this yields a particularly compact unit for transportation or support.

BRIEF DESCRIPTION OF THE DRAWINGS

Subsequently the invention is described in more detail based on an embodiment with reference to drawing figures. Further details of the invention can be derived from the subsequent description of the embodiment of the invention in combination with the patent claims and the appended drawing figures. Individual features of the invention can be implemented individually or in groups in different embodiments of the detector according to the invention, wherein:

FIG. 6 illustrates the enlarge detail according to FIG. 5 in an intermediary position between the operating position and the idle position; and sectional view of a.

DETAILED DESCRIPTION OF THE INVENTION

Figure 1:
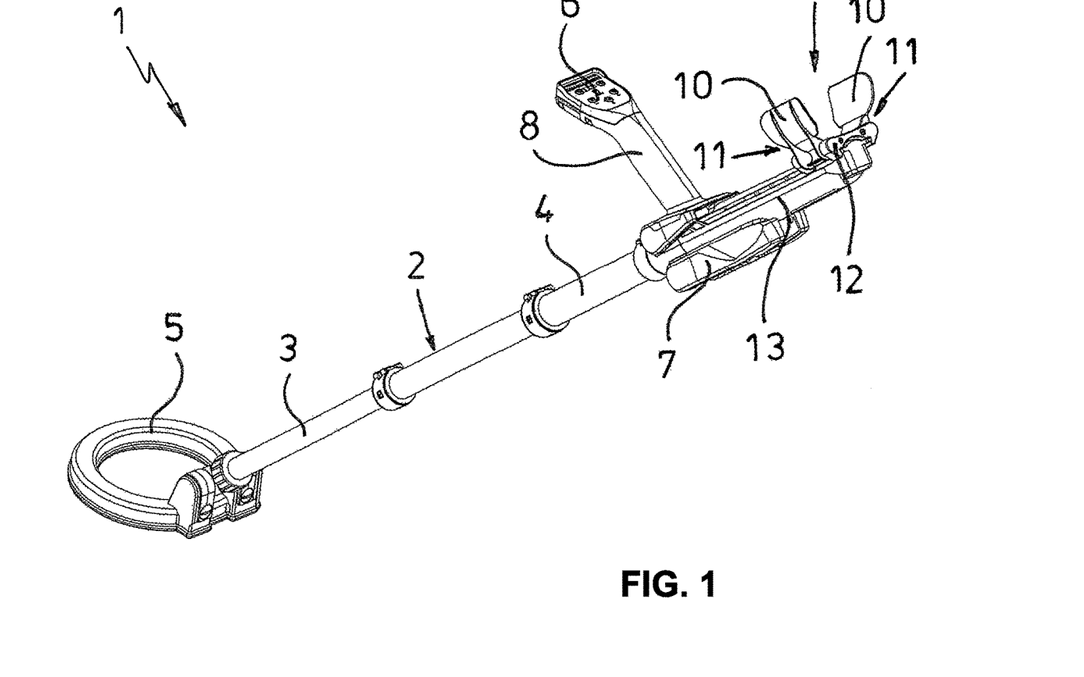
FIG. 1 illustrates a detector according to the invention with a measuring probe attached in front at a telescoping support tube and a handle element and an arm shell arranged at a rear of the support tube in an operating position in which the handle element and the arm shell are in the operating position.

FIG. 1 illustrates an embodiment of a detector 1 according to the invention in an operating position. The detector includes a telescoping support tube 2 with at least one forward tube element 3 and a rear tube element 4, wherein a measuring probe 5 is pivotably attached in front at the forward tube element 3 and an electronic units 6, a battery compartment 7, a handle element 8 are arranged at the rear tube element 4 and axially offset therefrom in rear direction a U-shaped arm shell 9 with two arm support bars 10 is arranged. Thus the arm shell 9 is supported axially moveable relative to the handle element 8 and includes 2 arm shell elements 11 which are pivotably arranged laterally at a support slide 12 wherein the pivoting has performed in a transversal direction of the support tube 2. The support slide 12 is supported axially moveable by a support rail 13 extending in longitudinal direction of the support tube 2 wherein the support rail is attached at a rear tube end 14 of the rear tube element 4.

Figure 2:
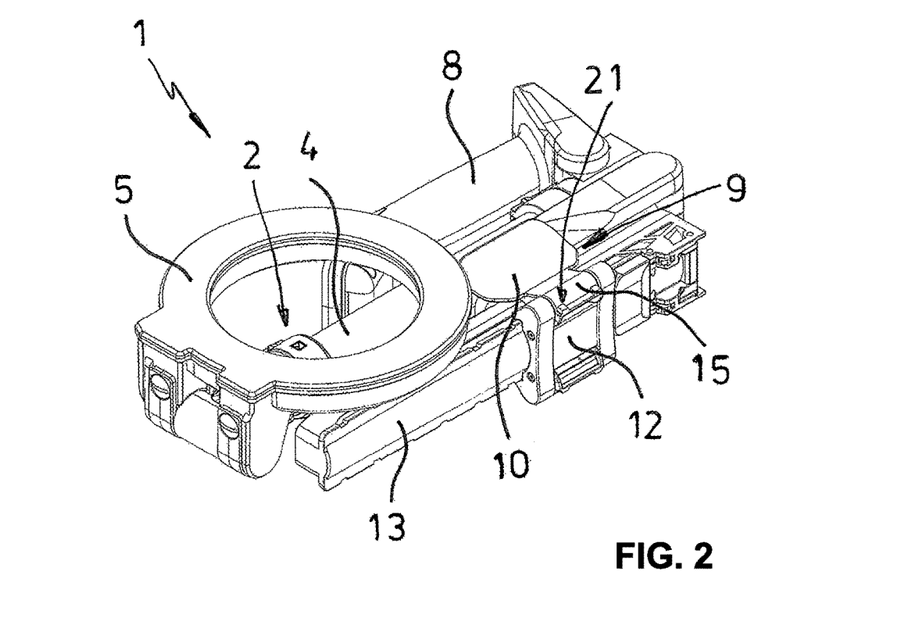
FIG. 2 illustrates the detector of FIG. 1 in the idle position with the handle element and the arm shell in the idle position.

FIG. 2 illustrates the detector 1 described supra in an idle position in which the handle element 8 and the support rail 13 together with the support slide 12 and the arm shell 9 are arranged in an idle position. In the illustrated idle position the handle element 8 and the support rail 13 are folded in a direction of the rear tube element 4 and respectively extend parallel thereto. The telescoping support tube 2 is pushed together so that the rear tube element 4 completely reaches over the front tube element 3. The measuring probe 5 that is pivotably attached at the forward tube element 3 is also pivoted over in a direction towards the rear tube element 4 and extends parallel to the support tube 2 contacting the rear tube element 4. The arm shell elements 11 are pivoted into an idle position from the operating position compared to the operating position of the detector 1 illustrated in FIG. 1 wherein the arm support bars 10 are oriented in a direction of the handle element 8 that is pivoted over.

FIGS. 3-6 illustrate enlarged details of a rear section of the detector 1 which includes the rear tube end 14 of the rear tube element 4 with the handle element 8 pivotably arranged thereon and with the support rail 13 pivotably arranged thereon in various positions of the support slide 12 and the arm shell elements 11. In these figures it is visible that the arm shell elements 11 respectively include an arm support bar 10 with a bar extension 15 through which the arm shell elements 11 are laterally attached at the support slide 12 in a pivotable manner. Furthermore the figures indicate that the support rail 13 has a rectangular cross sectional shape with two lateral longitudinal rail sides 16 and the support slide 12 includes two lateral slide longitudinal sides 17 which respectively extend in the longitudinal direction of the support tube 2 and which contact each other. Thus the longitudinal sides 17 of the slide include a longitudinal groove 18 for receiving as longitudinal bar 19 which is respectively configured at the longitudinal sides 16 of the support rail 13. FIGS. 3-6 also indicate that the support slide 12 is disengageably attachable at the support rail 13 at various locations through the arm shell elements 11.

Thus the longitudinal sides 17 of the rails include a plurality of first transversal locking grooves 20 which are configured narrower than the bar extensions 15. Two respective interlocking protrusions 21 are arranged at the bar extensions 15, wherein the interlocking protrusions lock the support slide 12 and axial direction at the support rail 13 when the interlocking protrusions engage the first interlocking transversal groove 20 of the support slide 13, wherein movement stops 22 for the arm shell elements 11 are arranged adjacent to the transversal locking grooves 20 wherein the movement stops limit a pivot angle of the arm shell elements 11. The movement stops 22 are formed by portions of the longitudinal bar 19 in the illustrated embodiment. These portion prevent the arm support bars 11 from pivoting over from the operating position illustrated in FIGS. 3 and 4 into the resting position illustrated in the figure. The first transversal locking grooves 20 have an identical distance from each other which corresponds to a distance of the two interlocking protrusions 21 arranged at the bar extension 15.

In addition to the first transversal locking grooves 20 the longitudinal rail sides 16 respectively include a second transversal locking groove 23 which is configured according to a width of the bar extensions 15. Thus a pivot angle of the arm shell elements 11 is not limited by the movement stops 22, so that the arm shell elements 11 are foldable in an opposite direction from the operating position into the idle position. Thus the bar extensions 15 engage the second interlocking transversal grooves 23 of the support rail 13 and interlock the support slide 12 in axial direction at the support slide 13.

Figure 3:
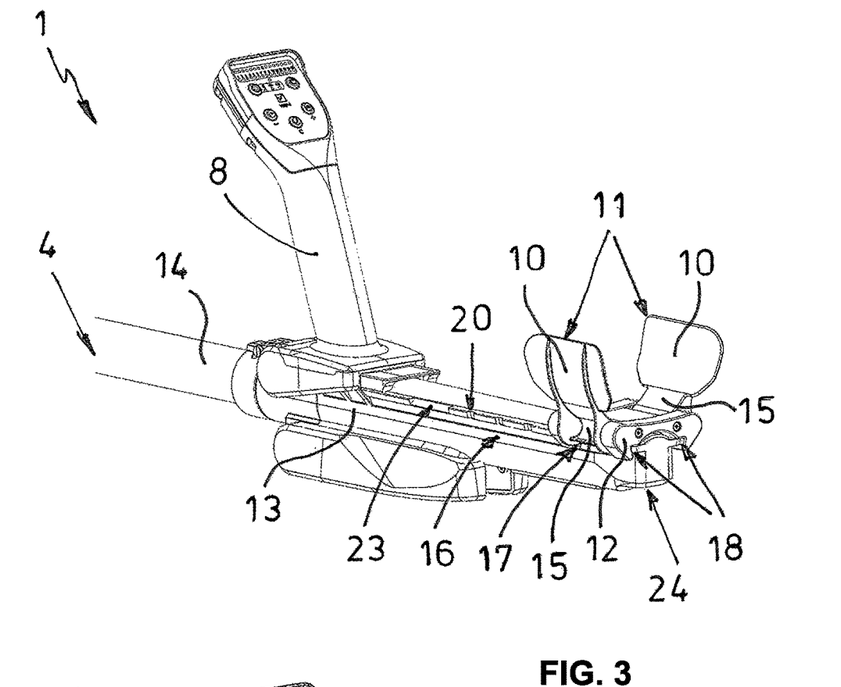
FIG. 3 illustrates an expanded detail of the rear section of the detector of FIG. 1 with the handle element and arm shell elements in the operating position; view
Figure 4:
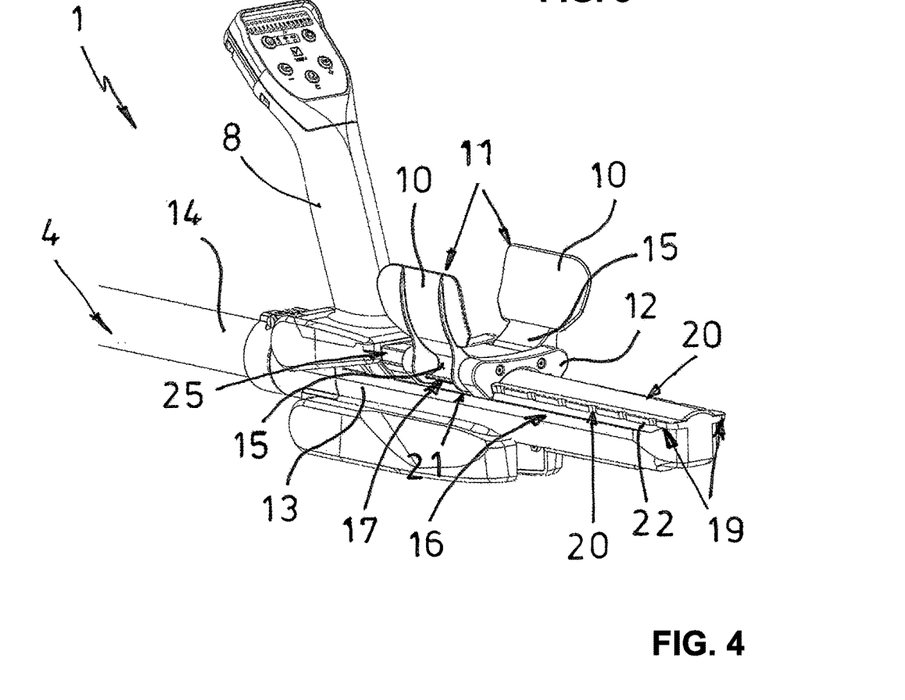
FIG. 4 illustrates an enlarged detail according to FIG. 3 with arm shell elements moved in a direction towards the handle element and arranged in the operating position.

FIG. 3 illustrates the support slide 12 arranged at a rear end 24 of the support rail 13, wherein the engagement protrusions 21 of the bar extensions 15 engage two of the first transversal locking grooves 20. FIG. 4 illustrates the support slide 12 with the arm shell elements 11 moved in a direction towards a front end 25 of the support slide 13, wherein the engagement protrusions 21 are out of engagement with the first locking grooves 20.

FIG. 4 illustrates like FIG. 3 the arm shell in the operating position.

Figure 5:
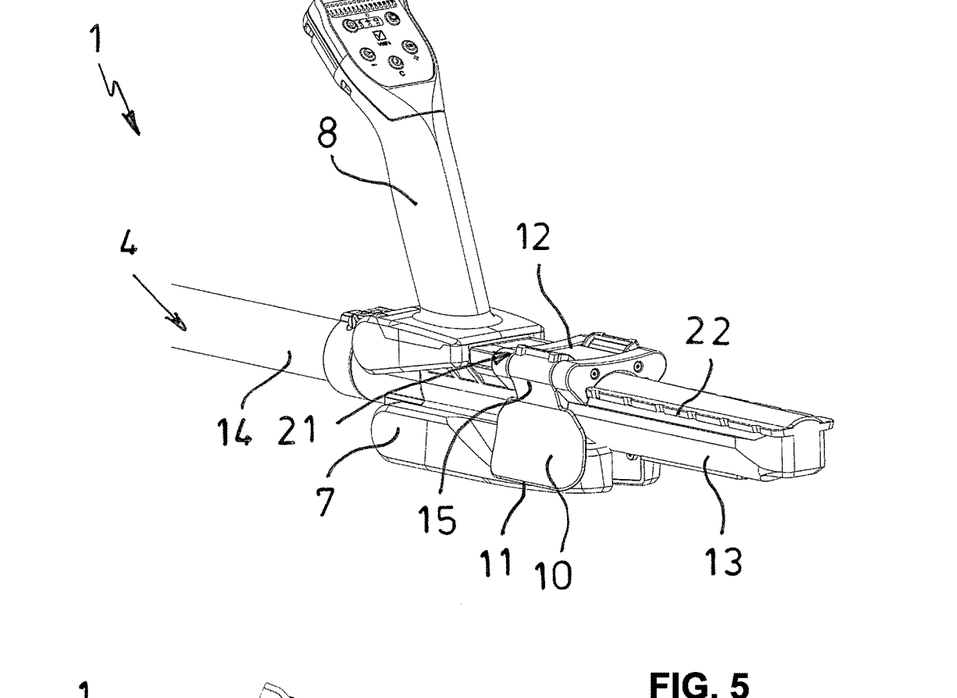
FIG. 5 illustrates an enlarged detail according to FIG. 4 with the arm shell elements in the idle position.

FIG. 5 illustrates the support slide 12 in a position of the support rail 13 in which the extension bars 15 respectively are in alignment with the second locking grooves 23. The arm shell elements 11 are pivoted from the operating position in which the arm support bars 10 are oriented in the same direction as the handle element 8 in the opposite direction by 180°. The bar extensions 15 now extend opposite to the direction of the handle element 8 and contact the battery compartment 7 with a flat side.

Figure 6:
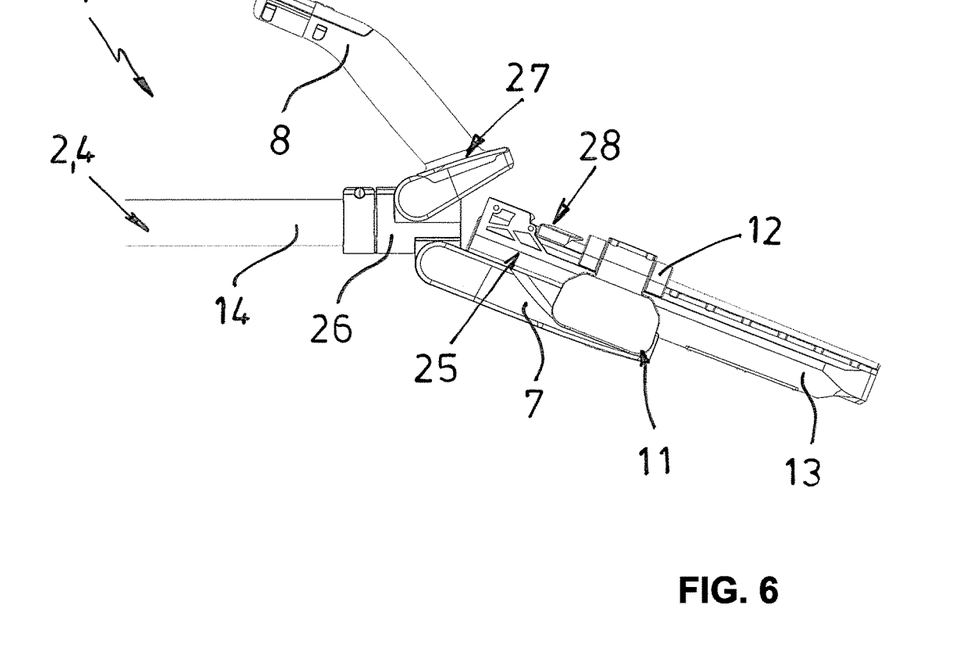

FIG. 6 illustrates that the handle element 8 and the support rail 13 are arranged pivotably moveable at the rear tube end 14 of the rear tube element 4 through a pivot link that is not visible in the figure and pivotably arranged at each other. Thus a support block 26 is arranged non moveable at the rear tube end 14 wherein the support rail 13 with the forward rail end 25 oriented towards the support tube 2 and the handle element 8 with a rear handle end 27 oriented towards the support tube 2 are pivotably arranged at the support block. This facilitates as illustrated in FIG. 2 to pivot the support rail 13 supporting the support slide 12 with the arm shell elements 11 between an operating position axially extending the rear tube element 4 into an idle position contacting the rear tube element 4 in parallel and to pivot the handle element 8 between an operating position transversally extending from the rear tube element 4 into an idle position contacting the rear tube element 4 in parallel. The handle element 8 and the support rail 13 can be attached at each other in a disengageable manner in the operating position of the handle element 8 and of the support rail 13 through an interlocking device 28 provided at the support rail 13 and can thus be fixated in a non-moveable manner relative to the support block 26. The interlocking device 28 engages the rear handle end 27 of the handle element 8 with disengageable form locking. It can also be derived from FIG. 6 that the support rail 13 in the illustrated embodiment is indirectly connected with the bearing block 6 through the battery compartment 7. Alternatively a direct connection of the support rail 13 with the bearing block 26 can be provided.

Figure 7:
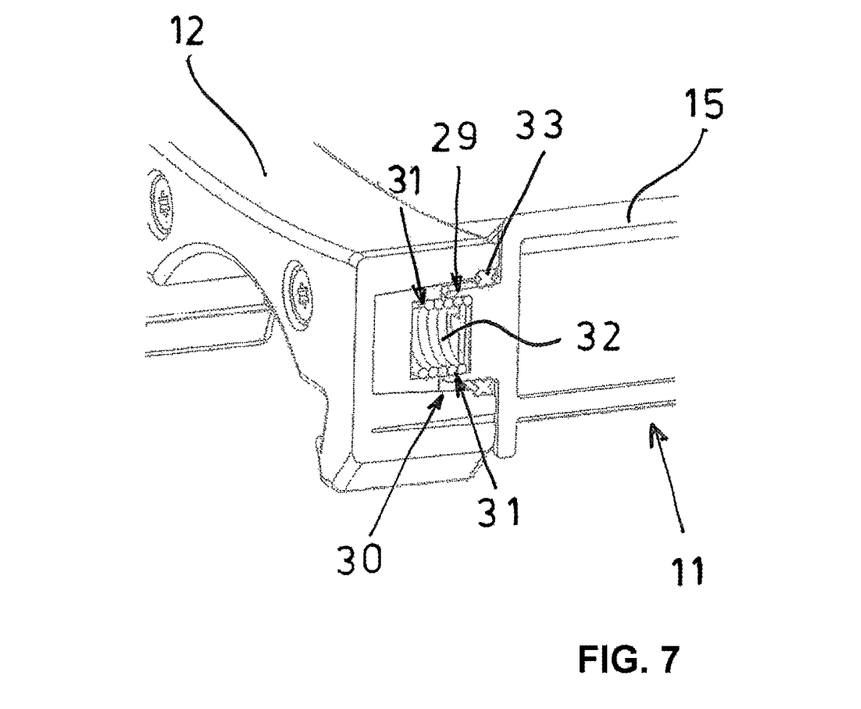
FIG. 7 illustrates a detail view of the support of the arm shell elements at the support slide.

FIG. 7 illustrates a detail view of the support of the arm shell elements 11 at the support slide 12 accordingly the bar extensions 15 include a cylindrical bearing pin 29 which extends into an associated cylindrical bearing bushing of the support slide 12. The bearing pin 29 and the bearing bushing 30 respectively include a pot shaped receiving cavity 31 for a spring 32 that is configured as a wound up torsion spring. Each bar extension 15 is provided on both sides with a respective bearing pin 29 which axially engages an associated axially extending bearing bushing 30 of the support slide 12. The spring 32 can be arranged on both sides or at one side of the bar extension 15. The spring 32 can be preloaded and arranged so that it loads the two arm shell elements 11 with a spring force which spreads the arm contact bars 10 between the bearing pinons 29 and the bearing bushings 30 a respective damper ring 33 is arranged which dampens a movement of the bar extensions 15 when reaching the idle position.

What is claimed is:
1. A detector, comprising:
   a telescoping support tube, including
   at least one forward tube element and a rear tube element, wherein a measuring probe is pivotably attached at the at least one forward tube element, wherein an electronics unit with a battery compartment, a handle element and axially offset therefrom in rearward direction a U-shaped arm shell with two arm support bars are attached at the rear tube element, wherein the arm shell is axially moveable relative to the handle element and includes two arm shell elements which are laterally arranged at a support slide so that the two arm shell elements are pivotably moveable in a transversal direction of the support tube, wherein the support slide is supported axially moveable at a support rail attached at a rear tube end of the rear tube element wherein the support rail extends in the longitudinal direction of the support tube, wherein the arm shell elements respectively include an arm support bar with a bar extension, wherein the bar extension attach the arm shell elements at the support slide, wherein the support rail has a cross sectional shape with two lateral longitudinal rail sides and the support slide includes two lateral longitudinal slide sides which respectively extend in a longitudinal direction of the support tube and contact each other, wherein the longitudinal slide sides include at least one longitudinal groove for receiving the longitudinal rail sides of the support rail, and wherein the support slide is fixateable in a disengageable manner at the support rail through the arm shell elements at various locations.

2. The detector according to claim 1, wherein the two arm shell elements are force loaded by at least one spring which spreads the arm support bars.

3. The detector according to claim 1, wherein the longitudinal rail sides include a plurality of transversal locking grooves which are configured narrower than or with identical width as the bar extensions and at least one associated interlocking protrusion is respectively arranged at the bar extensions, wherein the at least one associated interlocking protrusion interlocks the support slide axially at the support rail when the at least one associated interlocking protrusion engages the transversal locking grooves of the support rail, wherein at least one movement stop for the arm shell elements is respectively arranged adjacent to the transversal locking grooves or in the transversal locking grooves, and wherein the at least one movement stop limits a pivot angle of the arm shell elements and prevents a foldover of the arm support bars in the opposite direction.

4. The detector according to claim 3, wherein the longitudinal rail sides respectively include a transversal locking groove which is configured with identical width or wider than the bar extensions and a pivot angle of the arm shell elements is not limited by movement stops so that the arm shell elements are pivotable into an opposite direction, and wherein the bar extensions lock the support slide axially at the support rail when the bar extensions engage the transversal locking grooves of the support rail.

5. The detector according to claim 3, characterized in that the support rail includes at least one longitudinal bar at the longitudinal rail sides, wherein the at least one longitudinal bar is associated with the at least one longitudinal groove of the support slide arranged at at least one of the two longitudinal slide sides of the support slide, and wherein the transversal locking grooves or the movement stops are configured at the longitudinal bar.

6. The detector according to claim 1, wherein a support block is attached at a rear tube end of the rear tube element, wherein the support rail is pivotably linked at the support block with a forward rail end oriented towards the support tube, or wherein the handle element is pivotably linked at the support block with a rear handle element oriented towards the support tube.

7. The detector according to claim 6, wherein the support rail is pivotable between an operating position axially extending the rear tube element and an idle position contacting the rear tube element in parallel.

8. The detector according to claim 6, wherein the handle element is pivotable between an operating position transversally extending from the rear tube element and an idle position contacting the rear tube element in parallel.

9. The detector according to claim 6, wherein the handle element or the support rail are individually fixateable at the support block in a disengageable manner in the operating position through a locking device.

10. The detector according to claim 6, wherein the handle element and the support rail are attachable at each other in a disengageable manner in the operating position through an interlocking device arranged at the handle element or at the support rail so that the handle element and the support rail are fixateable relative to the support block.

11. The detector according to claim 2, wherein the at least one spring impacting the arm shell elements is a wound torsion spring.

12. The detector according to claim 1, wherein the longitudinal rail sides include a plurality of transversal locking grooves which are configured narrower than or with identical width as the bar extensions and at least one associated interlocking protrusion is respectively arranged at the bar extensions, wherein the at least one associated interlocking protrusion interlocks the support slide axially at the support rail when the at least one associated interlocking protrusion engages the transversal locking grooves of the support rail, wherein at least one movement stop for the arm shell elements is respectively arranged adjacent to the transversal locking grooves and in the transversal locking grooves, and wherein the at least one movement stop limits a pivot angle of the arm shell elements and prevents a foldover of the arm support bars in the opposite direction.

13. The detector according to claim 3, characterized in that the support rail includes at least one longitudinal bar at the longitudinal rail sides, wherein the at least one longitudinal bar is associated with the at least one longitudinal groove of the support slide arranged at at least one of the two longitudinal slide sides of the support slide, and wherein the transversal locking grooves and the movement stops are configured at the longitudinal bar.

14. The detector according to claim 1, wherein a support block is attached at a rear tube end of the rear tube element, wherein the support rail is pivotably linked at the support block with a forward rail end oriented towards the support tube, and wherein the handle element is pivotably linked at the support block with a rear handle element oriented towards the support tube.

15. The detector according to claim 6, wherein the handle element and the support rail are individually fixateable at the support block in a disengageable manner in the operating position through a locking device.

16. The detector according to claim 6, wherein the handle element and the support rail are attachable at each other in a disengageable manner in the operating position through an interlocking device arranged at the handle element and at the support rail so that the handle element and the support rail are fixateable relative to the support block.

* * * * *